(12) United States Patent
Dawes (10) Patent No.: US 7,824,749 B2
(45) Date of Patent: Nov. 2, 2010

(54) MULTI-LAYER POLYMERIC FILM FOR PACKAGING OVENABLE MEALS

(75) Inventor: Mark Edward Dawes, Middlesbrough (GB)

(73) Assignee: Dupont Teijin Films U.S. Limited Partnership, Wilmington, DE (US)

( * ) Notice: Subject to any disclaimer, the term of this patent is extended or adjusted under 35 U.S.C. 154(b) by 714 days.

(21) Appl. No.: 10/489,457

(22) PCT Filed: Sep. 23, 2002

(86) PCT No.: PCT/GB02/04304

§ 371 (c)(1), (2), (4) Date: Sep. 16, 2004

(87) PCT Pub. No.: WO03/026892

PCT Pub. Date: Apr. 3, 2003

(65) Prior Publication Data

US 2005/0031814 A1    Feb. 10, 2005

(30) Foreign Application Priority Data

Sep. 24, 2001 (GB) ................. 0122937.6
May 7, 2002 (GB) ................. 0210379.4

(51) Int. Cl.
| | |
|---|---|
| *B32B 27/00* | (2006.01) |
| *B32B 27/06* | (2006.01) |
| *B32B 27/08* | (2006.01) |
| *B65D 65/40* | (2006.01) |
| *B65D 81/34* | (2006.01) |

(52) U.S. Cl. .............. 428/35.7; 206/484.2; 426/106; 426/113; 426/126; 426/127; 426/243; 428/34.1; 428/35.8

(58) Field of Classification Search ............ 428/35.7, 428/35.8, 34.1; 206/484.2; 426/126, 127, 426/234, 243, 113, 106
See application file for complete search history.

(56) References Cited

U.S. PATENT DOCUMENTS 5,039,001 A * 8/1991 Kinigakis et al. .......... 229/120

FOREIGN PATENT DOCUMENTS

| | | |
|---|---|---|
| JP | 62134261 | 6/1987 |
| JP | 2248244 A | 4/1990 |
| WO | WO 90/07853 | 6/1990 |
| WO | WO 97/49609 | 12/1997 |
| WO | WO 99/62982 | 12/1999 |
| WO | WO 01/54886 A1 | 8/2001 |

* cited by examiner

*Primary Examiner*—David R Sample
*Assistant Examiner*—Brent T. O'Hern
(74) *Attorney, Agent, or Firm*—RatnerPrestia

(57) ABSTRACT

A heat-sealable peelable multi-layer laminated polymeric film comprising a polymeric substrate layer having on one side thereof a polymeric heat-sealable peelable layer and having on the opposite side thereof a polymeric shrinkable layer, wherein said shrinkable layer has a degree of shrinkage in a first dimension of about 10-80% over the temperature range 55 to 100° C., a ratio of shrinkage at 100° C. said first dimension relative to a second, orthogonal dimension in the range of 1:1 to 10:1, and further comprising one or two intermediate layer(s) wherein an intermediate layer is disposed between the substrate layer and the shrinkable layer and/or between the substrate layer and the heat-sealable peelable layer, and one or more layer(s) of an electrically conductive material; and use thereof as packaging for ovenable meals or as a lid on an ovenable container wherein the packaging is self-peeling and self-venturing during a cooking cycle.

29 Claims, 2 Drawing Sheets

MULTI-LAYER POLYMERIC FILM FOR PACKAGING OVENABLE MEALS

CROSS REFERENCE TO RELATED APPLICATIONS

This application is a National Stage filing of PCT Application No. GB02/04304, filed 23 Sep. 2002, and claims priority of GB Application No. 0210379.4, filed 7 May 2002 and GB Application No. 0122937.6, filed 24 Sep. 2001, the entire specifications of which are incorporated herein by reference.

FIELD OF THE INVENTION

This invention relates to a multi-layer polymeric film, and in particular to a laminated multi-layer polyester film. The film is suitable for use as packaging for ready-prepared ovenable meals, including use as the sole packaging means for the ovenable meal as well as use as a lid for a container for the ovenable meal particularly for a container which does not already contain a metallic component.

Plastic containers have been increasingly used in packaging applications, such as food packaging, and in particular for packaging convenience foods, for example ready-prepared ovenable meals which are warmed either in a microwave oven or in a conventional oven. Often the container comprises a polymeric material onto which has been deposited a thin metal layer, such as metallised (particularly flash-metallised) PET cartonboard. For example, the container may be produced from PET which has been metallised to an optical density in the range of about 0.01 to 4.0 and which is laminated to cartonboard. Such containers have been referred to as "susceptor" containers and are disclosed in, for instance, GB-A-2280342, EP-A-0563442, GB-A-2250408 and GB-A-2046060. The purpose of the susceptor container is to increase the heating effect, typically at predetermined locations, for instance, at a surface of the foodstuff to give it the appearance of having been "browned" or "crisped" and having been cooked by conventional, non-microwave cooking methods.

Such susceptor containers comprise a susceptor material which is a material which heats up rapidly under the influence of microwave energy and typically comprises layers of conductor particles (usually metallic particles). If the foodstuff is located in contact with, or adjacent to, the susceptor material, it receives heat by conduction to its surface which gives rise to a browning or crisping effect, whilst the remainder of the foodstuff is being heated throughout by a conventional microwave effect. Thus, the susceptor material may lie between the product and a substrate forming part of the container which holds the product, or it may lie to the outside of the substrate provided the susceptor effect is capable of being applied through the substrate to the product.

Ovenable containers for ready prepared meals often require lids which can both seal the container, in order to prevent leakage and drying out of the packaged contents during storage, and which can also be easily peeled from the container on opening. For those applications requiring lids, it has generally been necessary to provide a susceptor material in or on the portion of the container to which the lid has been attached via a heat-seal bond. This portion of the container is generally known as the "seal area". The rapid temperature increase of the susceptor material during the cooking cycle causes the heat-seal bond to soften and therefore allows easier peeling of the lid once cooking is completed.

Other important requirements of the lids are that they should not stick to the packaged contents and that they should be able to withstand the heat generated in the oven.

Container lids normally comprise a film comprising a flexible substrate and a sealable coating layer, and are often referred to as "lidding" films. Oriented polymeric film, particularly biaxially oriented polyester film, has previously been used as the flexible substrate for lidding films. In prior art lidding films, the heat-sealable layer is often applied to the substrate in an "off-line" coating step, i.e. after any stretching and subsequent heat-setting operation employed during the manufacture of the substrate. The heat-sealable layers of such films are generally applied using organic solvent, which is not suitable for "in-line" coating, and can cause sticking or blocking of the film during the normal winding operations used during film manufacture. In addition, the organic solvents used may be harmful, hazardous in use, or toxic and detrimental to the environment.

WO-A-96/19333 discloses a lidding film produced by an in-line coating process which avoids the use of substantial amounts of organic solvents. The film comprises a substrate and a coating layer of a copolyester of (a) 40 to 90 mole % of at least one aromatic dicarboxylic acid, (b) 10 to 60 mole % of at least one aliphatic dicarboxylic acid, (c) 0.1 to 10 mole % of at least one dicarboxylic acid comprising a free acid group and/or a salt thereof, (d) 40 to 90 mole % of at least one glycol having from 2 to 12 carbon atoms, and (e) 10 to 60 mole % of at least one polyalkylene glycol. The coating layer is applied as an aqueous dispersion or solution either before the film substrate is stretched or between the stretching steps of a biaxial stretching process. The process disclosed in WO-A-96/19333 is limited to certain types of coating compositions, i.e. those that are soluble or adequately dispersible in water.

The manufacture of sealed containers using lidding films involves the formation of a seal between the lidding film and the container. This seal is formed by placing the lid on top of the container and applying heat and pressure in order to soften or melt the sealable coating layer so that it adheres to the surface of the container and forms an effective seal between the lid and the container. Unfortunately, a seal which is strong enough to prevent leakage of the contents often results in difficulties in removing the lid when the container is to be opened. In particular, the lid may tear during peeling and portions of the film lid may fall into the contents of the container thereby spoiling the food. This problem is a particular disadvantage for containers which do not contain a susceptor material since there may have been insufficient heat transfer to the heat-seal bond. A strong seal and easy peeling properties, i.e. a clean peel, are desirable at both low, e.g. ambient, and high temperatures, e.g. after heating the packaged food contents in an oven. It would be desirable to eliminate the difficulties encountered during peeling. It would also be desirable to provide a lid which will function satisfactorily on all types of containers, rather than just susceptor containers.

A further consideration with ready-prepared convenience meals is that water vapour is driven from the food during the cooking cycle. If the steam thereby produced is not vented, the build-up of pressure may cause the packaging, for instance the film lid, to burst, causing fragments of the packaging to contaminate the contents of the container. Previous packaging for ovenable ready-prepared food containers generally required that the user pierce the packaging to prevent this. However, the need for piercing prior to warming the food in its container is often forgotten or not understood by the user. It would be advantageous to provide packaging which did not require the user to pierce it before cooking.

It is an object of this invention to provide a film suitable for use in packaging ready-prepared ovenable meals, which exhibits superior opening or peeling characteristics and is self-venting. It is a further object of this invention to provide a film suitable for use in packaging ready-prepared ovenable meals, which exhibits superior opening or peeling characteristics and is self venting, and which is particularly suitable for use as a lid on containers which do not contain a susceptor material as well as on containers which do contain a susceptor material. It is a particular object of the invention to provide a film suitable for use in packaging ovenable meals which is self-peeling during the cooking cycle.

DETAILED DESCRIPTION OF THE INVENTION

According to the present invention, there is provided a heat-sealable peelable multi-layer laminated polymeric film comprising a polymeric substrate layer having on one side thereof a polymeric heat-sealable peelable layer and having on the opposite side thereof a polymeric shrinkable layer, wherein said shrinkable layer has a degree of shrinkage in a first dimension of about 10-80% over the temperature range 55 to 100° C., and a ratio of shrinkage at 100° C. said first dimension relative to a second, orthogonal dimension in the range of 1:1 to 10:1, and further comprising intermediate layer(s) disposed between the substrate layer and the shrinkable layer and/or between the substrate layer and the heat-sealable peelable layer, and one or more layer(s) of an electrically conductive material.

In one embodiment, a second intermediate layer is present such that there is a first intermediate layer disposed between the substrate layer and the shrinkable layer and a second intermediate layer disposed between the substrate and the heat-sealable peelable layer. Preferably, however, only one intermediate layer is present. Preferably the intermediate layer is disposed between the substrate layer and the shrinkable layer.

The layers of electrically conductive material preferably comprise an elemental metal. However, any other suitable electrically conductive material approved for use with food packaging may be used, for instance graphite particles. Of course, where the film is intended for use as packaging for a microwaveable ready-prepared meal, the conductive material must be capable of absorbing the microwave energy. For brevity and convenience, the invention is hereinafter described with reference to the preferred embodiment wherein the electrically conductive layer is a metallic layer. It will nevertheless be appreciated that the following is applicable to other types of electrically conductive layers.

The metallic layer(s) is/are disposed between one or more of the following pairs of layers: (i) the substrate layer and the intermediate layer; (ii) the shrinkable layer and the intermediate layer; (iii) the substrate layer and the heat-sealable layer; (iv) the intermediate layer and the heat-sealable peelable layer; and (v) the substrate layer and the shrinkable layer. Preferably, the metallic layer(s) is/are between (i) the substrate layer and the intermediate layer and/or (ii) the shrinkable layer and the intermediate layer. In one embodiment, there is only one metallic layer, and this is preferably between the substrate layer and the intermediate layer.

The film of the present invention is suitable for use as packaging in ready-prepared ovenable meals and is self-opening under the action of the heat experienced during the cooking cycle. The presence of the metallic layer increases the efficiency of heat transfer within the film, thereby providing superior and more rapid self-peeling or self-opening characteristics during the cooking cycle in relation to existing films.

The film of the present invention is capable of providing a strong seal, thereby reducing the risk of content leakage during transport and storage, while at the same time providing a seal which is readily opened during the cooking cycle. Previously, it was generally considered that there had to be a trade-off between these two apparently conflicting characteristics.

The film of the present invention is suitable for use in two primary applications. Firstly, the film may be used as a lidding film for ovenable containers, particularly ovenable containers which do not themselves contain a metallic component. Thus, it is particularly suitable for use on containers and trays which do not contain susceptor material, either in the food-contact portion of the container or, more particularly, in the seal area of the container. The metallic component of the multilayer film replaces the need for the container or tray to comprise a metallic component, particularly in the seal area. Of course, even though the lidding film of the present invention avoids the need for susceptor material in the seal area of the container, it may still be desirable for the container to comprise susceptor material in other areas in order to "brown" or "crisp" the food substance, as noted above. Secondly, the film of the present invention may be used as the sole packaging means for ready-prepared ovenable meals in the absence of a container, such packaging being generally known has "flow-wrap" packaging, particularly the horizontal or vertical "form-fill and seal" type packaging well-known in the art.

Thus, in a first embodiment, the film of the present invention is intended for use by heat-sealing the film onto an ovenable container. During the cooking cycle the food product contained in the sealed container heats up and steam is produced. Heat from the steam and from general radiant heat is transferred to the film lid. Once the temperature of the shrinkable layer reaches its shrink initiation temperature, it starts to shrink, thereby applying a shear force to the film lid. In addition, the strength of the heat-seal bond between the container and the film lid will start to reduce as the temperature increases, particularly when the temperature passes the glass transition temperature of the heat-seal layer polymer. The presence of the metallic layer increases the rate of heat transfer to the shrinkable layer and to the heat-sealable layer. As the bond between the film lid and the tray weakens, the shear force exerted by the shrinkable layer causes the lid to curl back on itself and peel open during the cooking cycle. The self-peeling lid therefore allows the venting of steam generated during the cooking cycle. This is particularly advantageous for solid foods, particularly dough-based foods such as pizzas, because it prevents the base becoming soggy or water-logged. The self-peeling lid also avoids any difficulties, such as tearing of the film lid, which are associated with opening of the container by the user once the cooking cycle is complete.

In a second embodiment, the film of the present invention is intended for use as the sole packaging means for an ovenable meal. The film is heat-sealed to itself in order to completely envelop the food product. As before, once the temperature of the shrinkable layer reaches its shrink initiation temperature, it starts to shrink, thereby applying a shear force to the film as a whole. In addition, the strength of the heat-seal bond will start to decrease as the temperature increases. The shear force exerted by the shrinkable layer causes the film to separate at the heat-seal bond, curling back on itself and exposing the food product, with the advantages noted above. Such packaging is particularly useful for products such as pizzas, French bread, garlic bread and the like.

In both embodiments, the shear force producible by the shrinkage of the shrinkable layer is greater than the strength of the heat-seal bond provided by the heat-sealable layer.

A multi-layer laminated film according to the present invention typically exhibits a heat-seal value (at ambient temperatures) in the range of 200 to 1400 g/25 mm$^2$, preferably in the range of about 200 to about 1000 g/25 mm$^2$, when sealed to a standard APET/CPET tray (a composite material having an amorphous polyethylene terephthalate layer on top of a crystalline polyethylene terephthalate layer). Typical heat seal strengths of the film to itself are in the range of 600-800 g/25 mm$^2$.

The thickness of the multi-layer laminated film is typically from about 20 to about 350 µm, preferably from about 20 to about 250 µm, preferably from about 40 to about and 150 µm, and more preferably from about 60 to about 100 µm.

The primary characteristic of the film of the present invention is that it exhibits self-opening during the cooking cycle. In order for this to occur, the shrinkable layer must have a degree of shrinkage in one or both of said first and second dimension(s) that is greater than the degree of shrinkage of the substrate layer in that dimension. Further, the shear force produced by the shrinkage of the shrinkable layer should be sufficient to break the heat-seal bond, i.e. this shear force should be greater than the heat-seal bond strength, and thereby cause the film to self-peel during the cooking cycle.

As the skilled person is aware, the shrinkage characteristics of a film are determined by the stretch ratios and degree of heat-setting employed during its manufacture. The shrinkage behaviour of a film which has not been heat-set corresponds to the degree to which the film has been stretched during its manufacture. In the absence of heat-setting, a film which has been stretched to a high degree will exhibit a high degree of shrinkage when subsequently exposed to heat; a film which has only been stretched by a small amount will only exhibit a small amount of shrinkage. Heat-setting has the effect of providing dimensional stability to a stretched film, and "locking" the film in its stretched state. Thus, the shrinkage behaviour of a film under the action of heat depends on whether, and to what extent, the film was heat-set after the stretching operation(s) effected during its manufacture. In general, a film which has experienced a temperature $T_1$ during the heat-setting operation will exhibit substantially no shrinkage below temperature $T_1$ when subsequently exposed to heat after manufacture.

Accordingly, in order that the shrinkable layer exhibit the required shrinkage characteristics in the final laminated film, it is preferred that the shrinkable layer is not heat-set after stretching has been effected. However, the skilled person will recognise that films according to the present invention may also be produced using shrinkable layers which have been partially heat-set.

In a preferred embodiment, the substrate layer is a dimensionally stable film which exhibits substantially no shrinkage under the action of heat, and the shrinkable layer is a layer which shrinks in one dimension under the action of heat. The film of this embodiment, under the action of heat, therefore peels back on itself in one direction only. In this preferred embodiment, the substrate layer may be a biaxially-oriented heat-set polymeric layer and the shrinkable layer may be a uniaxially-oriented layer which has not been heat-set.

As the skilled person is aware, the dimensions of a polymeric film are defined in terms of the "machine direction" and the "transverse direction", which correspond to the axes of the film production apparatus. The machine direction is the direction of travel along the film production line and corresponds to the lengthways dimension of the film. The transverse direction is the direction orthogonal to the direction of travel of the film during manufacture and corresponds to the widthways dimension of the film. Conveniently, the shrinkable layer of the preferred embodiment described above exhibits uniaxial shrinkage in the transverse direction.

The present invention is not limited, however, to films which shrink in only one dimension. For instance, the shrinkable layer may shrink in a first dimension as well as in a second, orthogonal dimension. The degree of shrinkage in one dimension may be the same as, or different to, the degree of shrinkage in the second, orthogonal direction. Thus, in an alternative embodiment, the substrate layer is a dimensionally stable film which exhibits substantially no shrinkage under the action of heat, and the shrinkable layer is a layer which shrinks in two dimensions under the action of heat. The film of this embodiment, under the action of heat, therefore peels back on itself in two directions. In this preferred embodiment, the substrate layer may be a biaxially-oriented heat-set polymeric layer and the shrinkable layer may be a biaxially-oriented layer which has not been heat-set.

The present invention is also not limited to films in which the substrate exhibits substantially no shrinkage. For instance, the substrate may also exhibit shrinkage in one or two dimensions provided that the degree of shrinkage of the substrate layer in a given dimension is less than the degree of shrinkage of the shrinkable layer in that dimension. Thus, in an alternative embodiment the substrate layer and the shrinkable layer may be layers which have different compositions and/or have been produced using different manufacturing conditions (such as different stretch ratios and/or heat-set processing conditions) and which therefore have different relative degrees of shrinkage in a given dimension.

The respective layers of the multi-layer laminated film are described in more detail below.

The substrate is a self-supporting film or sheet by which is meant a film or sheet capable of independent existence in the absence of a supporting base. The substrate may be formed from any suitable film-forming material. Thermoplastic polymeric materials are preferred. Such materials include a homopolymer or copolymer of a 1-olefin, such as ethylene, propylene and but-1-ene, a polyamide, a polycarbonate, PVC, PVA, polyacrylates, celluloses and particularly a synthetic linear polyester.

The synthetic linear polyesters useful as the substrate may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxy-ethane (optionally with a monocarboxylic acid, such as pivalic acid) with one or more glycols, particularly an aliphatic or cycloaliphatic glycol, e.g. ethylene glycol, 1,3-propanediol, 1,4-butanediol, neopentyl glycol and 1,4-cyclohexanedimethanol. An aromatic dicarboxylic acid is preferred. An aliphatic glycol is preferred.

In a preferred embodiment, the polyester is selected from polyethylene terephthalate and polyethylene naphthalate. Polyethylene terephthalate (PET) is particularly preferred.

The substrate may also comprise a polyarylether or thio analogue thereof, particularly a polyaryletherketone, polyarylethersulphone, polyaryletheretherketone, polyaaryletherethersulphone, or a copolymer or thioanalogue thereof. Examples of these polymers are disclosed in EP-A-001879, EP-A-0184458 and U.S. Pat. No. 4,008,203. Blends of such polymers may also be employed. Other thermoset resin polymeric materials suitable for use as the substrate include addition-polymerisation resins, such as acrylics, vinyls, bis-maleimides and unsaturated polyesters; formaldehyde condensate resins, such as condensates with urea, melamine or phenols, cyanate resins, functionalised polyesters, polyamides or polyimides.

The substrate may comprise one or more discrete layers of the above film-forming materials. The polymeric materials of the respective layers may be the same or different. For instance, the substrate may comprise one, two, three, four or five or more layers and typical multi-layer structures may be of the AB, ABA, ABC, ABAB, ABABA or ABCBA type. Preferably, the substrate comprises only one layer.

Formation of the substrate may be effected by conventional techniques well-known in the art. Conveniently, formation of the substrate is effected by extrusion, in accordance with the procedure described below. In general terms the process comprises the steps of extruding a layer of molten polymer, quenching the extrudate and orienting the quenched extrudate in at least one direction.

The substrate may be uniaxially-oriented, but is preferably biaxially-oriented, as noted above. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the substrate-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. The actual heat-set temperature and time will vary depending on the composition of the film but should not be selected so as to substantially degrade the tear resistant properties of the film. Within these constraints, a heat set temperature of about 135° to 250° C. is generally desirable, as described in GB-A-838708.

Where the substrate comprises more than one layer, preparation of the substrate is conveniently effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a multi-layer polymeric film, which may be oriented and heat-set as hereinbefore described. Formation of a multi-layer substrate may also be effected by conventional lamination techniques, for example by laminating together a preformed first layer and a preformed second layer, or by casting, for example, the first layer onto a preformed second layer.

The substrate layer is suitably of a thickness from about 5 to about 200 µm, preferably from about 10 to about 150 µm and particularly from about 15 to about 40 µm.

The heat-sealable layer is any layer capable of forming a heat-seal bond to the surfaces of a container or to itself. Examples include polymeric materials such as polyester, EVA or modified polyethylene. The polymer material of the heat-sealable layer should soften to a sufficient extent that its viscosity becomes low enough to allow adequate wetting for it to adhere to the surface to which it is being bonded. The heat-seal bond is effected by heating to soften the polymer material of the heat-sealable layer, and optionally applying pressure, without melting (or otherwise affecting the structure or compromising the structural integrity of) the substrate layer and/or the shrinkable layer to any significant degree. Thus, the polymer of the heat-sealable layer should begin to soften at a temperature such that the heat-seal bond can be formed at a temperature which is less than the melting temperature of the substrate layer or the shrinkable layer. In one embodiment, the polymer of the heat-sealable layer should begin to soften at a temperature such that the heat-seal bond can be formed at a temperature which is between about 5 and 50° C. below, preferably between about 5 and 30° C. below, and preferably at least about 10° C. below the melting temperature of the polymer material of the substrate layer or the shrinkable layer.

The heat-sealable layer suitably comprises a polyester resin, particularly a copolyester resin derived from one or more dicarboxylic acid(s) or their lower alkyl (up to 14 carbon atoms) diesters with one or more glycol(s), particularly an aliphatic or cycloaliphatic glycol, preferably an aliphatic glycol, and more preferably an alkylene glycol. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Ethylene glycol or 1,4-butanediol is preferred.

Preferably, the heat-sealable layer comprises a copolyester derived from at least two dicarboxylic acids. Formation of the copolyester is conveniently effected in known manner by condensation, or ester-interchange, at temperatures generally up to 275° C.

In a preferred embodiment, the copolyester of the heat-sealable layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the copolyester is preferably in the range from 45 to 80, more preferably 50 to 70, and particularly 55 to 65 mole % based on the dicarboxylic acid components of the copolyester. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters are (i) copolyesters of azeleic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acic/butylene glycol (preferably having the components in the relative molar ratios of 45-55/55-45/100, more preferably 50/50/100) having a glass transition point ($T_g$) of −30° C. and a melting point ($T_m$) of 117° C.), and a copolyester of azeleic acid/terephthalic acid/ethylene glycol (preferably having the components in the relative molar ratios of 40-50/60-50/100, more preferably 45/55/100) having a $T_g$ of −15° C. and a $T_m$ of 150° C.

In an alternative embodiment, the heat-sealable layer comprises a copolyester derived from an aliphatic diol and a cycloaliphatic diol with one or more, preferably one, dicarboxylic acid(s), preferably an aromatic dicarboxylic acid. Typical polyesters which provide satisfactory heat-sealable properties include copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. In a preferred embodiment the copolyester is a copolyester of terephthalic acid with about 33 mole % 1,4-cyclohexane dimethanol and about 67 mole % ethylene glycol. An example of such a polymer is PETG™T6763 (Eastman) which comprises a copolyester of terephthalic acid, about 33% 1,4-cyclohexane dimethanol and about 67% ethylene glycol and which is always amorphous. In an alternative embodiment of the invention, the heat-sealable layer may comprise butane diol in place of ethylene glycol.

The copolyester of the heat-sealable layer is preferably a polymer which is amorphous or substantially amorphous, i.e. non-crystalline. In a preferred embodiment, the amorphous polymer of the heat-sealable layer has a glass transition temperature (Tg) of at least 40° C., preferably at least 70° C. and more preferably at least 80° C.

The thickness of the heat-seal layer is generally between about 1 and 30% of the thickness of the substrate layer. The heat-sealable layer may have a thickness of up to about 50 μm, preferably up to about 25 μm, more preferably up to about 15 μm, more preferably up to about 10 μm, more preferably between about 0.5 and 6 μm, and more preferably between about 0.5 and 4 μm. A thicker heat-sealable layer will generally form a stronger heat-seal bond, which may result in tearing of the film in opening.

Formation of the heat-sealable layer on the substrate layer may be effected by conventional techniques, for example by coating (generally off-line coating) or casting the polymer of the heat-sealable layer onto a pre-formed substrate layer. Formation of the heat-sealable layer and the substrate may also be effected by co-extrusion as is well-known in the art and described herein. The coextruded sheet is stretched to effect molecular orientation of the substrate, and preferably heat-set, as herein before described. For most polymers used in the heat-sealable layer, the conditions applied for stretching the substrate layer generally induce partial crystallisation of the heat-sealable polymer and it is therefore preferred to heat set under dimensional restraint at a temperature selected to develop the desired morphology of the heat-setting layer. In general, by effecting heat-setting at a temperature below the crystalline melting temperature of the heat-sealable polymer and permitting or causing the composite to cool, the heat-sealable polymer will remain essentially crystalline. Heat-setting at a temperature greater than the crystalline melting temperature of the heat-sealing polymer, will produce an essentially amorphous heat-sealable polymeric layer. Thus, heat-setting a composite sheet comprising a polyester substrate and a copolyester heat-sealable layer at a temperature within a range of from 175 to 200° C. generally yields a substantially crystalline heat-sealable layer. Using a temperature of from 200 to 250° C. generally yields an essentially amorphous heat-sealable layer. Certain polymers suitable for use in a heat-sealable layer, such as the PETO referenced above, remain amorphous at all times.

In one embodiment of the invention, the composite structure comprising the substrate layer and the heat-sealable layer may be provided by biaxially-oriented polyester films having a heat-sealable layer which are commercially available as MYLAR® OL film or MYLAR® WOL film (including grades OL, OL2, OL12, OL13, WOL and WOL12; DuPont Teijin Films). Mylar OL is a dual ovenable film which provides peelable seals to polar materials such as amorphous polyester (APET, also PETG), semicrystalline polyester (CPET), polyester coated paperboard and polyvinylchloride (PVC). The heat-seal bond to the container is generally effected in the range from about 140 to about 200° C.

In an alternative embodiment of the invention, the composite structure comprising the substrate layer and the heat-sealable layer may be provided by biaxially-oriented polyester films having an EVA heat-sealable layer which are commercially available as MYLAR® RL film (including grades RL42, RL43; DuPont Teijin Films). Mylar RL is a microwaveable film which provides peelable seals to polypropylene, poystryrene and polyethylene and also to polar materials such as APET, CPET, PVC and PVdC. The heat-seal bond to the container is generally effected in the range from about 120 to about 160° C.

The shrinkable layer is a self-supporting film or sheet by which is meant a film or sheet capable of independent existence in the absence of a supporting base. The shrinkable layer comprises any suitable polymeric material provided that it satisfies the requirements of a degree of shrinkage in a first dimension of about 10 to 80%, and preferably about 50 to 80%, over the temperature range 55 to 100° C., and a ratio of shrinkage at 100° C. in said first dimension relative to a second, orthogonal dimension in the range from about 1:1 to 10:1, preferably about 2:1 to 8:1, and more preferably from about 3:1 to 7:1. Typically, the shrinkage in one dimension is about 4:1, for instance one dimension of the film shrinks by about 75% of its size while the orthogonal dimension remains unchanged.

The shrinkable layer preferably comprises thermoplastic polymeric material. Such materials include a homopolymer or copolymer of a 1-olefin, such as ethylene, propylene and but-1-ene, polyamides, polycarbonates, polyesters (including copolyesters), PVC, PVA, polystyrenes, polyacrylates, celluloses and nylon (including nylon 6 and nylon 6,6). Particularly preferred is a polyester material, and particularly a synthetic linear polyester.

The synthetic linear polyesters useful for formation of the shrinkable layer may be obtained by condensing one or more dicarboxylic acids or their lower alkyl diesters, e.g. terephthalic acid, isophthalic acid, phthalic acid, 2,5-, 2,6- or 2,7-naphthalenedicarboxylic acid, succinic acid, sebacic acid, adipic acid, azeleic acid, 4,4'-diphenyldicarboxylic acid, hexahydro-terephthalic acid or 1,2-bis-p-carboxyphenoxy-ethane (optionally with a monocarboxylic acid, such as pivalic acid) with one or more glycols, particularly an aliphatic or cycloaliphatic glycol, e.g. ethylene glycol, 1,3-propanediol, 1,4-butanediol, neopentyl glycol and 1,4-cyclohexanedimethanol. Aromatic dicarboxylic acids are preferred. Aliphatic glycols are preferred.

In one embodiment, the polyester of the shrinkable layer is selected from polyethylene terephthalate (PET) and polyethylene naphthalate (PEN), and preferably from polyethylene terephthalate.

In a preferred embodiment, the shrinkable layer comprises a copolyester of terephthalic acid (TPA) and isophthalic acid (IPA) with one or more diols selected from the group consisting of aliphatic and cycloaliphatic diols. Preferably, the molar ratios of the isophthalate polyester units to the terephthalate polyester units are from 1 to 40 mol % isophthalate and from 99 to 60 mol % terephthalate, preferably from 15 to 20 mol % isophthalate and from 85 to 80 mol % terephthalate. The terephthalic acid/isophthalic acid copolyester may be obtained by condensation polymerisation of terephthalic acid and isophthalic acid with one or more, and preferably one, diol as set out above, preferably an aliphatic diol, more preferably ethylene glycol. In a particularly preferred embodiment, the shrinkable layer comprises a copolyester comprising substantially 18 mol % ethylene isophthalate and 82 mol % ethylene terephthalate.

In an alternative embodiment, the shrinkable layer comprises a copolymer of terephthalic acid, dihydroxyethyl azeleic acid and ethylene glycol, preferably wherein the dicarboxylic acid components of the copolymer are in a molar ratio of about 90-99% terephthalic acid and about 1-10% dihydroxyethyl azeleic acid, particularly about 95% terephthalic acid and about 5% dihydroxyethyl azeleic acid.

The shrinkable layer may itself comprise a monolayer or a multilayer structure, particularly an ABA type structure, particularly where the core layer is a layer comprising a polymer as described above in respect of the preferred embodiment. In such an ABA-type structure, the A layers preferably comprise a polyester or copolyester as described herein, particularly a copolyester of terephthalic acid with about 30-35 mole %, preferably about 33 mole % 1,4-cyclohexane dimethanol and about 65-70 mole %, preferably about 67 mole % ethylene glycol.

The thickness of the shrinkable layer is generally in the range of about 10 to about 100 μm, preferably about 25 μm to about 75 μm, and typically about 50 μm.

The shrinkable layer may be produced in accordance with the conventional film-forming procedures already described herein. In the preferred embodiment described above, the shrinkable layer is stretched only in one direction and not heat-set. Conveniently, the film is stretched only in the transverse direction. As noted above, stretching is effected to an extent determined by the nature of the polymer. For example, PET is usually stretched so that the dimension of the oriented film in the direction of stretching is from about 2 to 8 times, preferably from about 2 to about 5 times, and more preferably between about 3 and 4 times its original dimension.

The intermediate layer acts as a "heat-sink" to prevent the film overheating, which may lead to melting or delamination of the copolyester layers, and should have a relatively low dielectric constant and a relatively high combustion point. In one embodiment the intermediate layer has a dielectric constant of less than about 10, preferably less than about 6, more preferably in the range from about 0.2 to about 6, more preferably in the range from about 0.2 to about 4 (measured, for instance, at 50 Hz). In a further embodiment, the intermediate layer has a melting or combustion point of more than about 180° C., preferably more than 200° C., preferably more than about 220° C., and preferably more than about 240° C. It may be made of any suitable film-forming material but is conveniently made of paper or cellophane (or other cellulose-based film forming material, preferably regenerated cellulose).

In the embodiments wherein the multilayer film is required to be transparent or translucent, the intermediate layer is suitably cellophane. In the embodiments where the multilayer film is required to be opaque, the intermediate layer is suitably paper. The intermediate layer may comprise a printable surface and be capable of displaying printed information or graphics.

The thickness of the intermediate layer is generally in the range of about 12 to about 100 μm, preferably from about 20 to about 50 μm, and typically about 25 μm.

The metallic layer is suitably produced by conventional metallisation techniques well-known in the art. Deposition of a metallic layer may be effected by conventional metallising techniques, for example, by deposition from a suspension of finely-divided metallic particles in a suitable liquid vehicle, or by electron beam evaporation, electroless plating, or preferably, by a vacuum deposition process in which a metal is evaporated onto the surface to be coated in a chamber maintained under conditions of high vacuum. The metallic layer may also be applied by printing techniques, for example as disclosed in EP-A-0276654, the disclosure of which is incorporated herein by reference. Suitable metals include palladium, titanium, chromium, nickel, copper (and alloys thereof, such as bronze), silver, gold, cobalt and zinc, but aluminium is to be preferred for reasons both of economy and ease of bonding. Metallising may be effected over the entire exposed surface of the layer to be coated or over only selected portions thereof, as desired.

The metallic layer is conveniently deposited in a thickness from monoatomic proportions to about 50 μm or greater, although a preferred range is from 0.005 to 15.0 μm and particularly from 0.01 to 0.5 μm.

The metallic layer may be produced by deposition of the metal by the metallisation techniques noted above on a surface of the substrate (one or more of the surface(s) juxtaposed with the heat-sealable layer, shrinkable layer or the intermediate layer), or a surface of the intermediate layer (one or more of the surface(s) juxtaposed with the substrate, the heat-sealable layer, or the shrinkable layer), or a surface of the shrinkable layer (suitably the surface juxtaposed with an intermediate layer) or a surface of the heat-sealable layer (suitably the surface juxtaposed with the substrate layer). Preferably, the metallic layer is deposited on either or both of the surface of the substrate layer juxtaposed with the intermediate layer or the surface of the shrinkable layer juxtaposed with the intermediate layer, and is preferably deposited on the surface of the substrate layer juxtaposed with the intermediate layer.

If desired, a primer layer may be applied, prior to metallisation, to the surface of the layer to be metallised in order to increase the adhesion of the metal thereto. Such primer layers are disclosed in, for example, EP-A-0348062 and EP-A-0375215, the disclosures of which are incorporated by reference.

One or more of the layers of the polymeric film may conveniently contain any of the additives conventionally employed in the manufacture of polymeric films. Thus, agents such as cross-linking agents, dyes, pigments, voiding agents, lubricants, anti-oxidants, radical scavengers, flame retardants, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular, a layer may comprise a particulate filler which can improve handling and windability during manufacture. The particulate filler may, for example, be a particulate inorganic filler or an incompatible resin filler or a mixture of two or more such fillers.

By an "incompatible resin" is meant a resin which either does not melt, or which is substantially immiscible with the polymer, at the highest temperature encountered during extrusion and fabrication of the film. The presence of an incompatible resin usually results in a voided layer, by which is meant that the layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule. Preferred materials include a low or high density olefin homopolymer, particularly polyethylene, polypropylene or poly-4-methyl-pentene-1, an olefin copolymer, particularly an ethylene-propylene copolymer, or a mixture of two or more thereof. Random, block or graft copolymers may be employed.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the primary polymeric material of the layer.

Preferred particulate inorganic fillers include titanium dioxide and silica.

Titanium dioxide particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as the chloride process or the sulphate process. The titanium dioxide particles may be coated, preferably with inorganic oxides such as aluminium, silicon, zinc, magnesium or mixtures thereof. Preferably the coating additionally comprises organic compound(s), such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds. The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate. The coating layer on the titanium dioxide particles is preferably in the range from 1 to 12% of inorganic oxides, and preferably in the range from 0.5 to 3% of organic compound, by weight based upon the weight of titanium dioxide.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 μm, more preferably 0.05 to 1.5 μm, and particularly 0.15 to 1.2 μm.

The size distribution of the inorganic filler particles is also an important parameter, for example the presence of excessively large particles can result in the film exhibiting unsightly 'speckle', i.e. where the presence of individual filler particles in the film can be discerned with the naked eye. It is preferred that none of the inorganic filler particles incorporated into the substrate layer should have an actual particle size exceeding 30 μm. Particles exceeding such a size may be removed by sieving processes which are known in the art. However, sieving operations are not always totally successful in eliminating all particles greater than a chosen size. In practice, therefore, the size of 99.9% by number of the inorganic filler particles should not exceed 30 μm, preferably should not exceed 20 μm, and more preferably should not exceed 15 μm. Preferably at least 9%, more preferably at least 95% by volume of the inorganic filler particles are within the range of the volume distributed median particle diameter ±0.8 μm, and particularly ±0.5 μm.

Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50 th percentile.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In one embodiment, the film of the present invention is optically clear, preferably having a % of scattered visible light (haze) of <10%, preferably <6%, more preferably <3.5% and particularly <2%, measured according to the standard ASTM D 1003. In this embodiment, filler is typically present in only small amounts, generally not exceeding 0.5% and preferably less than 0.2% by weight of a given layer.

In an alternative embodiment, the film is opaque, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. For films which do not contain an opaque intermediate layer, a multilayer film is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in a given layer is preferably in the range from 1% to 30%, more preferably 3% to 20%, particularly 4% to 15%, and especially 5% to 10% by weight, based on the weight of the layer polymer.

The surface of an opaque film preferably exhibits a whiteness index, measured as herein described, in the range from 60 to 120, more preferably 80 to 110, particularly 90 to 105, and especially 95 to 100 units.

The surface of the substrate nearest the heat sealable layer is referred to herein as the primary side. The side of the substrate opposite to the side nearest the heat-sealable layer is referred to herein as the secondary side. The secondary side of the substrate may have thereon one or more further polymeric layers or coating materials. Any coating of the secondary side is preferably performed "in-line".

In one embodiment, an additional coating on the secondary side may comprise a "slip coating" in order to improve the handling and windability of the film, particularly when the film substrate is a PET polyester substrate. A suitable slip coating may be, for instance a discontinuous layer of an acrylic and/or methacrylic polymeric resin optionally further comprise a cross-linking agent, such as described in EP-A-0408197, the disclosure of which is incorporated herein by reference. An alternative slip coating may comprise a potassium silicate coating, for instance as disclosed in U.S. Pat. Nos. 5,925,428 and 5,882,798, the disclosures of which are incorporated herein by reference.

In a further embodiment, the film has on one surface thereof a printable or ink-receiving layer, and optionally a primer layer (such as that disclosed in EP-0680409, EP-0429179, EP-0408197, EP-0576179 or WO-97/37849, the disclosures of which are incorporated herein by reference) between the film and the printable or ink-receiving layer in order to increase adhesion. Suitable printable or ink-receiving layers are disclosed in, for instance, EP-0696516, U.S. Pat. No. 5,888,635, U.S. Pat. No. 5,663,030, EP-0289162, EP-0349141, EP-0111819 and EP-0680409, the disclosures of which are incorporated herein by reference. The multilayer film may carry printed information at a number of other locations, for instance on the intermediate layer as mentioned above. It is also possible to "reverse print" the heat-sealable peelable layer as is well known in the art.

In a further embodiment, the film has on one surface thereof a gas barrier layer. In one embodiment, the gas barrier layer is applied to the secondary surface of the substrate layer of the film using conventional techniques. Gas barrier layers are well-known in the art and include, for instance, aluminium oxide, silicon oxides, polyvinylidene chloride (PVDC), polyvinyl alcohol, saponified ethylene-vinyl acetate copolymer, ethylene-vinyl alcohol copolymer and vermiculite. Aluminum oxide layers can be applied using vacuum deposition techniques, as known in the art and described herein. Polymeric gas barrier layers can be applied using conventional coating techniques, for instance as describe herein. Gas barrier layers, and their methods of application, are disclosed for instance in EP-A-0962506, JP-A4/331246, JP-A-6/32924, U.S. Pat. No. 4,927,689, U.S. Pat. No. 6,364,987, JP-A-188624, JP-A-9/241999, EP-A-0498569 and EP-A-0518647. In a preferred embodiment, the gas barrier layer is aluminium oxide. Preferably, the gas barrier layer is sufficient to provide the film with an oxygen transmission rate of 1-10 $cm^3/m^2/day$, or lower.

According to a further aspect of the present invention there is provided a process for the production of a multi-layer film which comprises the steps of:

(i) forming a polymeric substrate;
(ii) providing a polymeric heat-sealable peelable layer;
(iii) forming a shrinkable layer of polymeric film having a degree of shrinkage in a first dimension of about 10-80% over the temperature range 55 to 100° C. and a ratio of shrinkage at 100° C. in said first dimension relative to a second, orthogonal dimension in the range from 1:1 to 10:1;
(iv) forming an intermediate layer of film-forming material;
(v) forming one or more metallic layer(s);
(vi) disposing an intermediate layer between the substrate layer and the shrinkable layer and/or between the substrate layer and the heat-sealable layer, preferably between the substrate layer and shrinkable layer; and
(vii) laminating the shrinkable layer, intermediate layer, substrate layer and heat sealable layer to form a multilayer structure, wherein said formation of said one or more metallic layer(s) is effected by metallisation, prior to lamination, of one or more surface(s) of one or more of the substrate, intermediate layer, shrinkable layer and/or heat-sealable layer as described herein.

In the preferred embodiment where the intermediate layer is disposed between the substrate and the shrinkable layer, the heat-sealable is provided on a first surface of the substrate layer, preferably by co-extrusion with the polymer of the substrate.

In a preferred embodiment, step (vii) above is effected by laminating a first surface of the intermediate layer to a surface of the shrinkable layer and laminating a second surface of the intermediate layer to the second surface of the substrate layer, preferably to the second surface of a substrate layer having on its first surface a co-extruded heat-sealable layer.

The lamination process to form the multilayer structure may be effected in respect of all layers simultaneously or alternatively may be effected sequentially such that the multilayer structure is constructed with a series of individual lamination steps between adjacent layers. Preferably lamination is effected simultaneously.

The lamination steps may use conventional laminating equipment and adhesives.

The adhesives suitable for use in preparing the films of this invention are well-known to those skilled in the art, and include epoxy-, polyurethane- or acrylic-based one- or two-part systems. The adhesive may be solvent-based (including water-based) or solvent-free. The particular adhesive chosen will depend on the compositions and the types of layers that are present in the film. Generally, excellent bond strengths can be obtained with high-performance two-component isocyanate adhesives such as Herbert's EPS 74/KN75. Solvent-free adhesives, such as Herbert's 1K-LF 190X3 or Herbert's 2K-LF 541/Hardener 110 may also be used. It is preferable to use solvent-free adhesives for the construction of the laminate as this reduces exposure of the shrinkable layer to any unnecessary thermal cycles.

Prior to lamination of two layers, one or both of the opposing surface(s) of the layers to be laminated may, if desired be subjected to a chemical or physical surface-modifying treatment to improve the bond between the two layers. Thus, prior to lamination of a pre-formed shrinkable layer onto a substrate, the exposed surface of the substrate may, if desired, be subjected to a chemical or physical surface-modifying treatment to improve the bond between that surface and the subsequently applied pre-formed shrinkable layer. A preferred treatment, because of its simplicity and effectiveness, which is particularly suitable for the treatment of a polyolefin substrate, is to subject the exposed surface of the substrate to a high voltage electrical stress accompanied by corona discharge. Alternatively, a layer may be pretreated with an agent known in the art to have a solvent or swelling action on the layer polymer. Examples of such agents, which are particularly suitable for the treatment of a polyester layer, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

As noted above, in one embodiment, a polymeric film according to the invention is useful for sealing or providing a lid on a container, such as a thermoformed tray, thermoformed bowl or blow-moulded bottle. The container may be formed of polyester, such as polyethylene terephthalate, or of polypropylene, polystyrene, or may be PVDC coated, or may be glass, or maybe PET-coated cartonboard or paperboard. As noted above, the multilayer film is particularly suitable for use on a container or tray which does not contain susceptor material or a container or tray which does not contain susceptor material in or on the seal area. A film according to the invention is particularly suitable for use as a lid for an APET/CPET container, especially a thermoformed tray, which is suitable for packaging food or drink. The film is also, of course, capable of being used on other types of containers such as a foil container (such as an aluminium foil tray), or a metallised, susceptor container.

The invention further provides a sealed container comprising a receptacle containing food or drink, and a lid formed from a multilayer film as defined herein.

The multilayer film is used as a lidding film to seal a container according to techniques well-known to those skilled in the art. Once the food to be packaged has been introduced into the container, the heat-sealable film lid is affixed using temperature and optionally pressure using conventional techniques and equipment. The multilayer film lid is placed on the container such that the heat-sealable layer is in contact with the surfaces of the container and the shrinkable layer is the outermost surface of the film lid.

It is preferred that a portion of the film lid in contact with the container forms a stronger heat-seal bond with the container than that formed between the container and the remainder of the film lid in contact with the container. In this way, the film lid is more strongly attached to the container during the cooking cycle and remains attached to one side of the container during the self-peeling process, thereby ensuring that the film lid peels back on itself during the cooking cycle. Thus, for a quadrilateral container, such as a rectangular or square container, it is preferred that the heat-seal bond on one side of the container is stronger that the heat-seal bond on the other three sides. For a circular or oval container, it is preferred that one sectional arc of the substantially circular or elliptical circumference of the open end of the container, for instance an arc comprising less than about 180°, preferably less than about 90°, preferably less than about 60°, and preferably less than about 45° of the circumference, has a stronger heat-seal bond than the remaining section of the circumference. Varying strengths of heat-seal bond may be achieved by forming different sections of the heat-seal bond between the film lid and the container at different temperatures. Thus, for a quadrilateral tray for instance, it is preferred that the heat-sealing equipment is configured such that three of the sides of the heat-seal head operate at a temperature in the range of about 110 to 150° C., preferably at about 130° C., and the fourth side operates at a temperature in the range of about 150 to 200° C., preferably about 170° C.

In a particularly preferred embodiment, the film lid is folded over the flange on this fourth side of the container and the heat-seal head also forms a heat-seal bond between the film lid and the underside of the flange of the container on this fourth side. Ideally the film would be folded over the flange on the fourth side and sealed top and bottom.

In a further embodiment, the bond between the film lid and one side of the container may be enhanced by mechanical means, such as crimping or stapling, in order to ensure that the lid peels back on itself during the cooking cycle.

Also, as noted above, the film of the present invention is useful as the sole packaging means in an ovenable ready-prepared meal in which the seal is provided by heat-sealing a first portion of the film to a second portion of the film. Such seals are effected by conventional techniques and include "fin seals" and "overlap seals", preferably fin seals.

Once the food product is placed within the film, the two portions of the film which are to be bonded together are brought together with the heat sealable surface of one film portion being in contact with the heat sealable surface of one film portion being in contact with the heat sealable surface of the other film portion, and the heat-seal bond formed by the application of temperature and optionally pressure using conventional equipment. The heat-seal bond may be formed at temperatures in the range of about 110 to about 150° C.

The invention further provides a packaged, sealed food product wherein the packaging which effects and forms the seal around the food product is a multilayer film heat-sealed to itself, as defined herein.

The multilayer film is particularly suitable for use as packaging for ready prepared convenience foods which are intended to be warmed in a microwave oven. However, the invention is also applicable for ready-prepared meals which are intended to be warmed in any other type of oven, such as a conventional convection oven, a direct radiation oven and a forced hot air oven.

In a further aspect of the invention there is provided use of the heat-sealable peelable multilayer laminated polymeric film described herein as, or for the purpose of providing, packaging for ovenable meals wherein the packaging is self-peeling and self-venting during a cooking cycle.

In a further aspect of the invention there is provided use of the heat-sealable peelable multilayer laminated polymeric film described herein as, or for the purpose of providing, a heat-sealable lid on an ovenable container wherein said heat-sealable lid is self-peeling and self-venting during a cooking cycle.

Figure 1:
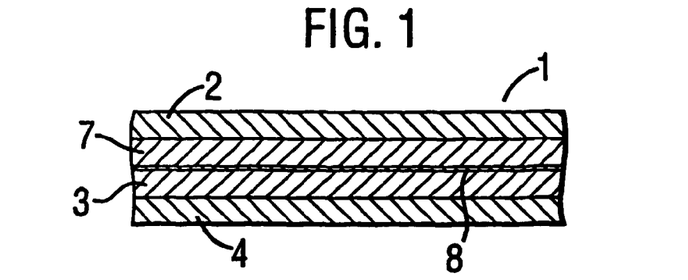
FIGS. 1 and 2 are sectional views of exemplary embodiments of a film according to the invention.
Figure 2:
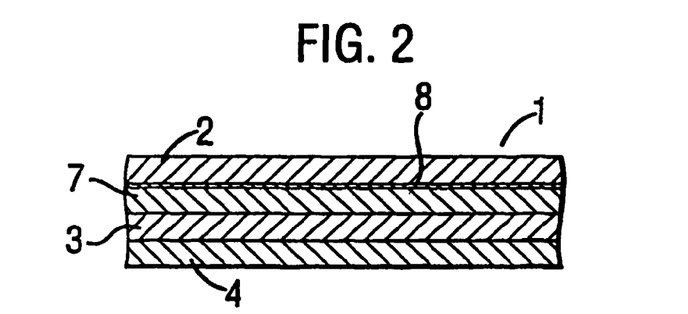

The invention is illustrated by FIGS. 1 to 8 herein, in which:

FIGS. 1 and 2 are sectional views of embodiments of the film (1) according to the present invention which comprises a shrinkable layer (2), an intermediate layer (7), a metallic layer (8), a substrate layer (3) and a heat-sealable layer (4).

Figure 3:
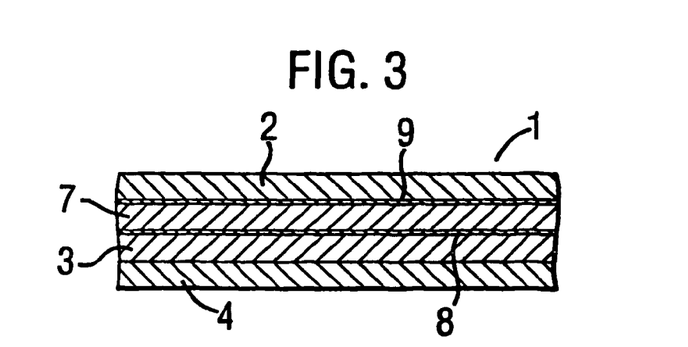
FIG. 3 is a sectional view of an alternative embodiment of a film according to the invention.

FIG. 3 is a sectional view of an alternative embodiment of the film (1) according to the present invention which comprises a shrinkable layer (2), a metallic layer (9), an intermediate layer (7), a metallic layer (8), a substrate layer (3) and a heat-sealable layer (4).

Figure 4:
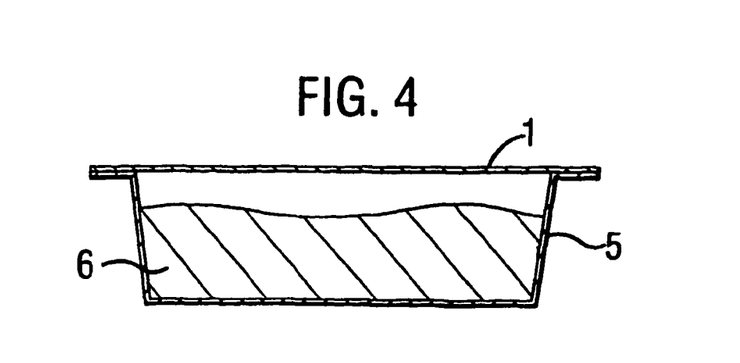
FIG. 4 is a sectional view of a film according to the invention after having been heat-sealed to a container.

FIG. 4 is a sectional view of the film (1) after having been heat-sealed to the container (5) having food product (6) therein. The heat-seal layer is in contact with the container, with the shrinkable layer uppermost.

Figure 5:
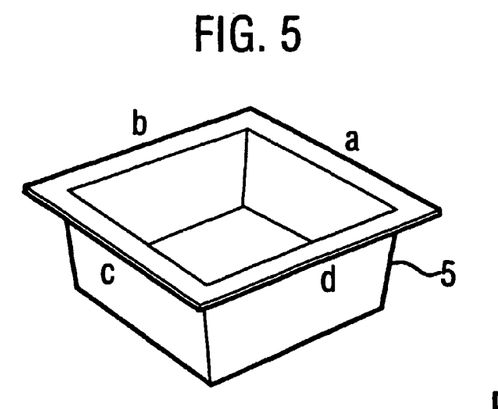
FIG. 5 is a view of a container suitable for closure with a film according to the invention.

FIG. 5 is a view of the container (5) having walls (a), (b), (c) and (d). In a preferred embodiment of the invention, the film lid is heat sealed to the tray such that the heat-sealed lid has a stronger bond to the upper surface of wall (a) than to sides (b), (c) and (d).

Figure 6:
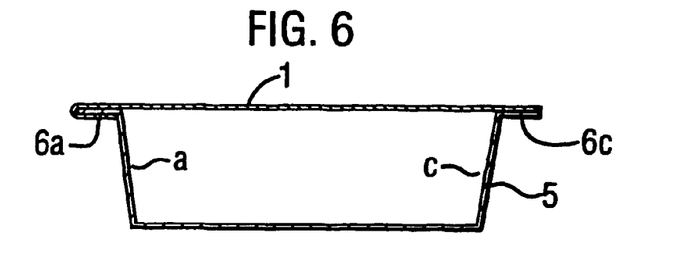
FIG. 6 is a sectional view of a container closed with a film according to the invention.

FIG. 6 is a sectional view of container (5) having walls (a), (b), (c) and (d) (walls (b) and (d) not shown) and having at the top of walls (a) and (c) flanges (6a) and (6c). According to a preferred embodiment of the invention, film (1) is heat-sealed to both the upper and lower surfaces of flange (6a).

Figure 7:
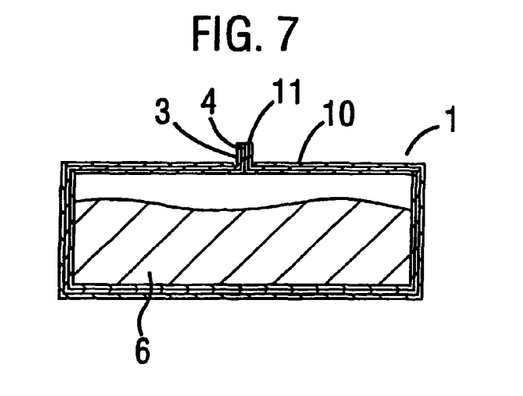
FIG. 7 is a sectional view of a film according to the invention, sealed to itself to contain a food product.
Figure 8:
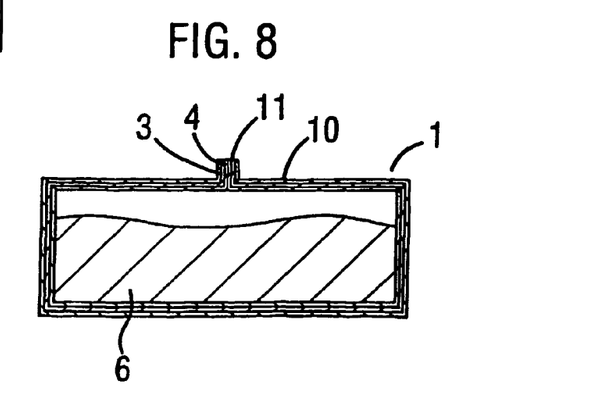
FIG. 8 is a another sectional view of a film according to the invention, sealed to itself to contain a food product.

FIGS. 7 and 8 are sectional views of a film (1) containing food product (6) therein. The film is sealed to itself at fin seal (11) thereby enclosing the food product. The heat-sealable layer (4) and substrate layer (3) are shown. Layer (10) represents the metallic layer(s), the intermediate layer and the shrinkable layers. FIG. 7 shows a film wherein the outer edges of the substrate are not covered with a metallic layer, an intermediate layer or a shrinkable layer. However, the metallic layer, or the metallic layer and the intermediate layer, or the metallic layer and the intermediate layer and the shrinkable layer could extend to the edge of the substrate layer. FIG. 8 shows a film wherein the metallic layer and the intermediate layer and the shrinkable layer extend to the edge of the substrate layer.

The following test methods may be used to determine certain properties of the polymeric film:

(i) Wide angle haze is measured using a Hazegard System XL-211, according to ASTM D 1003-61.
(ii) Whiteness index is measured using a Colorgard System 2000, Model/45 (manufactured by Pacific Scientific) based on the principles described in ASTM D313.
(iii) Heat-seal strength is measured as follows. The laminated film is sealed, by means of the heat-sealable layer, to a standard APET/CPET tray using a Microseal PA 201 (obtained from Packaging Automation Ltd, England) tray sealer at a temperature of 180° C., and pressure of 80 psi for two seconds. Strips of the sealed film and tray are cut out at 90° to the seal, and the load required to pull the seal apart measured using an Instron operating at a crosshead speed of 0.2 mmin$^{-1}$. The procedure is generally repeated 4 times, and a mean value of 5 results calculated.
(iv) Shrinkage at a given temperature is measured by placing the sample in a heated water bath at that temperature for 30 seconds. The shrinkage behaviour over the range 55 to 100° C. is assessed using a number of film samples at different temperatures over this range, generally at intervals of 5-10° C.

The invention is further illustrated by the following examples. It will be appreciated that the examples are for illustrative purposes only and are not intended to limit the invention as described above. Modification of detail may be made without departing from the scope of the invention.

EXAMPLES

Example 1

Preparation of the Composite Film Comprising the Substrate and the Heat-Sealable Layer A polymer composition comprising polyethylene terephthalate was extruded and cast onto a cooled rotating drum and stretched in the direction of extrusion to approximately 3 times its original dimensions. The film was passed into a stenter oven at a temperature of 100° C. where the film was stretched in the sideways direction to approximately 3 times its original dimensions. The biaxially stretched film was heat-set at about 230° C. by conventional means. The heat-set film was then coated off-line using conventional coating means with a copolyester of azeleic acid/terephthalic acid/ethylene glycol (45/55/100) to give a dry coating thickness of 2 μm. The total film thickness was 20 μm.

Preparation of the Shrinkable Layer

A polymer composition comprising a copolyester of 18 mol % ethylene isophthalate and 82 mol % ethylene terephthalate was melt-extruded and cast onto a cooled rotating drum. The film was passed into a stenter oven at a temperature of about 90° C. where the film was dried and stretched in the sideways direction to approximately 3.8 times its original dimensions. The total thickness of the final film was 50 μm.

The substrate layer was metallised with aluminium using a vapour deposition technique onto the opposite side of the film than that coated with the azeleic acid/terephthalic acid/ethylene glycol copolymer. The thickness of the metallic layer was approximately 20 μm.

Preparation of the Laminated Film According to the Present Invention

The multilayer laminated film of the present invention is prepared by laminating together the shrinkable film and the substrate/heat-sealable composite film, prepared as described above, with an intermediate layer comprising cellophane (UCB Wigton, UK; dielectric constant 0.38; combustion point 242° C.), of thickness 25 μm. The intermediate layer was sandwiched between the metallised surface of the substrate layer and the shrinkable layer. The lamination is effected according to conventional techniques using a First Laminator machine (Taisei Laminator Company Ltd.). The adhesive used in the lamination was Novacote™ 2525/3 two-part adhesive.

Preparation of a Sealed Container with Lid According to the Present Invention

The multilayer film prepared in accordance with the above procedure was heat-sealed to a PET-covered cartonboard tray (Trykko Pack A/S, Denmark), using a Sentinel Heat Sealer (Packaging Industries, USA) at a temperature of 130° C. and a pressure of 40 psi for 0.5 sec on three sides and a temperature of 160° C. and a pressure of 80 psi for 0.5 seconds on the fourth side of the tray.

The sealed container was placed in a 900W microwave oven for 2 minutes, and removed from the oven at the end of the heating cycle. The film lid of the container had peeled back from three sides of the container and remained attached to the fourth side.

Preparation of a Sealed Product According to the Present Invention

A dough-based food product was placed on a multilayer film prepared in accordance with the above procedure. The food product was wrapped in the film which was then heat-sealed to itself to form a fin-seal as shown in FIG. 8 using conventional equipment at a temperature of 130° C. for 0.5 sec.

The sealed product was placed in a 900W microwave oven for 2 minutes, and removed from the oven at the end of the heating cycle. The film had peeled back from itself, from the fin seal, to reveal the food product lying exposed on the film.

Example 2

A laminated film was prepared in accordance with Example 1 except that the shrinkable layer was prepared as follows:

A polymer composition comprising a copolyester of 18 mol % ethylene isophthalate and 82 mol % ethylene terephthalate was co-extruded with a copolyester of terephthalic acid/1,4-cyclohexane dimethanol/ethylene glycol (100/33/67) to form an ABA structure, the core layer (B) being the ethylene isophthalate/ethylene terephthalate copolyester. The film was passed into a stenter oven at a temperature of about 90° C. where the film was stretched in the sideways direction to approximately 3.8 times its original dimensions.

Example 3

A laminated film was prepared in accordance with Example 1 except that the intermediate layer was 45 gsm bleach craft paper (United Paper Mills, Finland).

The invention claimed is:

1. A heat-sealable peelable multilayer laminated polymeric film comprising the following substantially coextensive elements:
   (a) a self-supporting polymeric film substrate having a first melting point temperature,
   (b) a polymeric heat-sealable peelable layer on one side of the substrate, and
   (c) a self-supporting polymeric heat shrinkable film having a second melting point temperature, on a side of the substrate opposite the heat-sealable peelable layer;
   (d) a layer of an electrically conductive material; and
   (e) one or two intermediate heat-sink film(s), disposed between the substrate and the shrinkable film and/or between the substrate and the heat-sealable peelable layer;
wherein said shrinkable film has a degree of shrinkage in a first dimension of about 10-80% over the temperature range 55 to 100° C., and a ratio of shrinkage at 100° C. in said first dimension relative to a second, orthogonal dimension in the range of 1:1 to 10:1;
wherein the shrinkable film has a degree of shrinkage in one or both of said first and second dimension(s) that is greater than the degree of shrinkage of the film substrate in said dimension(s) at substantially the same temperature; wherein the polymeric heat-sealable, peelable layer is capable of forming a heat seal bond to a receptacle surface at a temperature which is less than said first and second melting point temperatures; and wherein a difference in the degree of shrinkage in the substrate layer and the shrinkable film upon heating is selected to curl said film away from said receptacle bonded thereto generating a peeling force sufficient to overcome said bond between the heat sealable layer and at least part of said receptacle surface.

2. The multilayer laminated polymeric film according to claim 1 wherein the substrate film comprises polyester.

3. The multilayer laminated polymeric film according to claim 1 wherein the substrate film comprises poly(ethylene terephthalate).

4. The multilayer laminated polymeric film according to claim 1 wherein the shrinkable film comprises a copolyester of terephthalic acid (TPA) and isophthalic acid (IPA) with one or more diols selected from the group consisting of aliphatic and cycloaliphatic diols.

5. The multilayer laminated polymeric film according to claim 4 wherein said copolyester comprises isophthalate polyester units and terephthalate polyester units in molar ratios of from 1 to 40 mol % isophthalate and from 99 to 60 mol % terephthalate.

6. The multilayer laminated polymeric film according to claim 4 wherein the copolyester comprises ethylene glycol.

7. The multilayer laminated polymeric film according to claim 4 wherein the shrinkable film comprises a copolyester comprising substantially 18 mol % ethylene isophthalate and 82 mol % ethylene terephthalate.

8. The multilayer laminated polymeric film according to claim 1 wherein the heat-sealable peelable layer comprises a copolyester of an aromatic dicarboxylic acid, an aliphatic dicarboxylic acid and a glycol.

9. The multilayer laminated polymeric film according to claim 8 wherein said copolyester of the heat-sealable peelable layer comprises terephthalic acid, azelaic acid and ethylene glycol.

10. The multilayer laminated polymeric film according to claim 9 wherein said copolyester is a copolyester of ethylene glycol with about 55% terephthalic acid and about 45% azelaic acid.

11. The multilayer laminated polymeric film according to claim 1 wherein the heat-sealable peelable layer comprises a copolyester derived from an aliphatic diol, a cycloaliphatic diol and a dicarboxylic acid.

12. The multilayer laminated polymeric film according to claim 11 wherein the heat-sealable peelable layer comprises a copolyester of terephthalic acid with ethylene glycol and 1,4-cyclohexanedimethanol.

13. The multilayer laminated polymeric film according to claim 12 wherein the heat-sealable peelable layer comprises a copolyester of terephthalic acid with ethylene glycol and 1,4-cyclohexanedimethanol wherein the molar ratio of 1,4-cyclohexanedimethanol to ethylene glycol is in the range from 20:80 to 40:60.

14. The multilayer laminated polymeric film according to claim 13 wherein the heat-sealable peelable layer comprises a copolyester of terephthalic acid with about 33 mole % 1,4-cyclohexanedimethanol and about 67 mole % ethylene glycol.

15. The multilayer laminated polymeric film according to claim 1 wherein there is only one intermediate heat-sink film.

16. The multilayer laminated polymeric film according to claim 15 wherein said intermediate heat-sink film is between the substrate film and the shrinkable film.

17. The multilayer laminated polymeric film according to claim 1 wherein there is a first intermediate heat-sink film between the substrate film and the shrinkable film and a second intermediate heat-sink film between the substrate film and the heat-sealable peelable layer.

18. The multilayer laminated polymeric film according to claim 1 wherein said intermediate heat-sink film has a dielectric constant of less than 6.

19. The multilayer laminated polymeric film according to claim 1 wherein the intermediate heat-sink film comprises paper or cellophane.

20. The multilayer laminated polymeric film according to claim 1 wherein said electrically conductive layer(s) is/are disposed between one or more of (i) the shrinkable film and the intermediate heat-sink film; and (ii) the intermediate heat-sink film and the substrate film.

21. The multilayer laminated polymeric film according to claim 1 wherein there is only one electrically conductive layer.

22. The multilayer laminated polymeric film according to claim 1 comprising an electrically conductive layer between the substrate film and the intermediate heat-sink film.

23. The multilayer laminated polymeric film according to claim 1 wherein the electrically conductive layer(s) is/are metallic layer(s).

24. A sealed container comprising a receptacle containing food or drink, and a lid formed from a laminated multilayer polymeric film according to claim 1.

25. A packaged sealed food product wherein the packaging which effects and forms the seal around the food product is a laminated multilayer polymeric film according to claim 1.

26. A method of packaging an ovenable meal, comprising
   a) providing a multilayer laminated polymeric film according to claim 1;
   b) forming a package comprising the multilayer laminated polymeric film; and
   c) sealing the ovenable meal inside the package;
wherein the package is self-peeling and self-venting during a cooking cycle.

27. The method of claim 26 wherein the package further comprises a container adapted to be sealed with a lid comprising the multilayer laminated polymeric film structure, and step c) comprises heat-sealing the lid to the container.

28. The method of claim 26 wherein said multilayer laminated polymeric film is the sole packaging for the ovenable meal.

29. The method of claim 26 wherein the package is suitable for use in a microwave oven.

* * * * *